United States Patent [19]
Meiattini

[11] 3,886,045
[45] May 27, 1975

[54] PROCESS FOR THE ENZYMATIC DETERMINATION OF GLUCOSE WITH A GLUCOSE-OXIDASE/PEROXIDASE ENZYME SYSTEM

[76] Inventor: Franco Meiattini, Via Montanini 140, Siena, Italy

[22] Filed: May 11, 1973

[21] Appl. No.: 360,372

[30] Foreign Application Priority Data
May 12, 1972 Italy............................ 9480/72

[52] U.S. Cl. ........................................... 195/103.5
[51] Int. Cl. .......................... C12k 1/04; C07g 7/02
[58] Field of Search ................................. 195/103.5

[56] References Cited
OTHER PUBLICATIONS
Trinder, Ann. Clin. Biochem., 6, 24, 1969.
Hall et al., Anal. Biochem., 26, 12, 1968.

*Primary Examiner*—A. Louis Monacell
*Assistant Examiner*—Esther L. Massung

[57] ABSTRACT

Process for enzymatic determination of glucose with a glucose-oxidase-peroxidase enzyme system involving the use of a reduced acceptor which is oxidized. As reduced acceptor in the enzymatic reaction catalyzed by peroxidase, a ferrocyanide salt is oxidized to ferricyanide; then a further reducing system is introduced, which system is oxidized by the ferricyanide, with the formation of a colored quinone compound, the reaction between ferricyanide and the reducing system taking place spontaneously.

14 Claims, No Drawings

PROCESS FOR THE ENZYMATIC DETERMINATION OF GLUCOSE WITH A GLUCOSE-OXIDASE/PEROXIDASE ENZYME SYSTEM

The invention relates to a process for the determination of glucose and to compositions for use in the process. It particularly relates to the determination of glucose in body fluids using a glucose-oxidase-peroxidase enzyme system. The process can be adapted to be operated manually or automatically, and readings can be taken during the course of the determination or at the end point.

GENERAL CONCEPTS — PRIOR ART

The determination of the glucose concentration in biologic liquids with various chemical methods has been used for a long time. These determinations have been remarkably improved by D. Keilin and E. F. Hartree with the use of a specific enzyme, glucose-oxidase (GOD).

GOD is a flavoprotein having a specific enzymatic activity for beta-D-glucopyranose which it causes to be oxidized to delta-D-gluconolactone. The enzyme prosthetic group (flavine adenine dinucleotide or FAD) transfers protons from glucose to the molecular oxygen, reducing the oxygen to hydrogen peroxide ($H_2O_2$). The gluconolactone spontaneously reacts with water and is converted to gluconic acid.

These reactions may be schematically represented as follows:

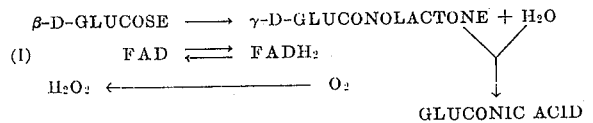

The hydrogen peroxide generated in this enzymatic reaction may be used as a substrate by another enzyme, peroxidase (POD). This enzyme catalyzes the oxidation of suitable substrates (reduced acceptors) by hydrogen peroxide which is reduced to water, according to the equation:

(II) REDUCED ACCEPTOR + $H_2O_2$ $\xrightarrow{POD}$ $H_2O$ + OXIDIZED ACCEPTOR

By using a particular chromogen acceptor, this reaction may be detected and quantified by a simple photometric reading. As the two reactions (I) and (II) can be linked, this photometric reading permits the determination of the amount glucose present in the material being tested.

The practical application of these combined enzymatic reactions resulted in a very useful chemical-clinical laboratory procedure for the specific determination of glucose in body fluids. The specificity of this method, its main advantage, is, however, bound to particular conditions:

1. The GOD and POD enzymes must be very pure;
2. The chromogen acceptors must be selected with extreme care, particularly taking into account their redox potential.

These two conditions are essential and must be met so as to eliminate any interferences which may compromise the specificity of the system.

There are many methods which use the aforedescribed enzymatic reactions for the determination of glucose, but, although retaining the GOD-POD system, they are different from one another as far as the chromogen acceptor which is used. While many substances are used for this purpose, not one of them is free from objection. Examples of such substances and their defects are listed below.

o-Dianisidine: it is toxic (potentially carcinogenic), it is slightly soluble at the reaction pH, whereby the product derived from its oxidation (3,3-dimethoxy--4,4-diiminidiphenoquinone) tends to deposit in the test tubes or along the automatic equipment flow tubes, staining them in brown and consequently modifying the photometric readings and the results; it is poorly sensitive;

o-Toluidine: it has the same disadvantages as o-dianisidine; in addition, the final color produced is less fast;

o-Phenylendiamine: it may create allergies; it is poorly soluble and stable;

Guaiac: it is slightly soluble and produces an unstable color.

Adrenalin: it is toxic; it produces an unstable color and is too sensitive to variations of the molecular oxygen concentrations in the reaction system;

Phenolphthalein: it is unstable in the leucobase form, as it is used in the reactions;

ABTS (ammonium salt of 2,2'-azino-di-(3-ethyl-benzothiazoline-6-sulphonic acid); it is affected by the presence of proteins or other substances present in the non-deproteinized samples; it has a very slow oxidation rate; it has a very various visible light absorption spectrum, with different absorptions near the maxima, whereby the photometric readings must be carried out with monochromatized equipment; in the presence of uric acid it gives proportionally lower values;

Ferrocyanide: it is poorly sensitive and is affected by the presence of the bilirubin in non-deproteinized products.

The abovementioned substances are used as reduced chromogen acceptors in the GOD-POD enzymatic system. There are, however, other systems used for the enzymatic determination of glucose. A variation is the following:

(I) Glucose + $H_2O$ + $O_2$ $\xrightarrow{GOD}$ gluconic acid + $H_2O_2$ (IV) $H_2O_2$ + $CH_3OH$ $\xrightarrow{CATALASE}$ $2H_2O$ + HCOH (V) HCOH + specific reagent → color.

With this system, the determination of glucose is based on the determination of formaldehyde which is effected in different ways; the most common one uses the chromogen reaction between the aldehyde and a chromotropic acid in a hot (100°C), highly acidic environment. These conditions prevent the utilization of this analytical method on a large scale.

Another system may be schematically represented as follows:

(I) Glucose + $H_2O$ + $O_2$ $\xrightarrow{GOD}$ gluconic acid + $H_2O_2$ (VI) $H_2O_2$ + 2 I$^-$ + 2 $H^+$ $\xrightarrow{Mo(VI)}$ 2 $H_2O$ + $I_2$ The iodine ($I_2$) which is released may be determined by a direct spectrophotometric reading (either as iodine or as a triiodide), or may be determined after the formation of a colored complex with suitable substances such as starch, o-toluidine, diethyl-p-phenylendiamine and the like.

The chief disadvantages of these methods are:

1. necessity of using only deproteinized samples so as to obtain really reliable results;
2. necessity of preparing numerous separate reagents;
3. possibility of interference by numerous substances;
4. difficult standardization;
5. necessity, at least for the first mentioned method, of utilizing baths or thermostats at 100°C and highly concentrated acids (sulphuric acid).

Other published methods use only the enzymatic reaction (I) catalyzed by GOD. The hydrogen peroxide which is formed is then directly determined without the use of other enzymes or redox systems. For instance, a method is described wherein the formation of a chelate compound of hydrogen peroxide, orangexylenol and titanium (VI) is used to determine the peroxide content. This method, however, can be applied only to deproteinized samples, and moreover requires the frequent preparation of fresh solutions, the stock solutions being relatively unstable and unsuitable for long preservation.

GENERAL CONCEPTS — THE PRESENT INVENTION

It is, accordingly, an object of the present invention to provide an enzymatic method for the rapid and accurate determination of glucose in body fluids.

It is another object of the present invention to provide a method which is convenient to use, may be carried out at room temperature, and requires the preparation of few standard solutions.

It is a further object of the present invention to provide compositions which may be used in the method of the present invention.

In accordance with the present invention, there is provided a colorimetric method for the determination of glucose in body fluids. This process comprises the steps:

i. adding to a sample of a body fluid an enzymatic system containing glucose-oxidase and peroxidase, to which has been added sodium or potassium ferrocyanide, ii. incubating the sample and enzyme systems at room temperature whereby the ferrocyanide is converted to ferricyanide equivalent to the amount of glucose present in the sample, and iii. reacting the ferricyanide with a reducing system which forms a colored product on oxidation, said reducing system consisting of a phenolic compound and an aminoantipyrine.

The reactive system of the present invention results in the elimination of the disadvantages inherent in the previous used systems, using a chain of redox reactions whereby the external interferences are considerably reduced or eliminated.

The substance used as "reduced acceptor" in the enzymatic reaction catalyzed by POD (II) is ferrocyanide either as its potassium or sodium salt. In this reaction, the ferrocyanide is oxidized to ferricyanide. As most photometers do not have a sufficient sensitivity to read the yellow color of the ferricyanide (which presents a maximum of absorption at about 420 nm), another reducing system was introduced, hereinafter referred to as "Reactive Detector," which is oxidized by the ferricyanide, formed in the reaction (II), resulting in the formation of a red colored quinonic compound (maximum absorption at 500 – 550 nm, according to the substances used in the composition of the Reactive Detector). The reaction between the ferricyanide and the Reactive Detector is not enzymatic but takes place spontaneously. The Reactive Detector consists essentially of two substances: (1) a phenolic compound and (2) a derivative of the 1-phenyl-4-amino-5-pyrazolinone, such as, for example, 4-amino-2,3-dimethyl-1-phenyl-5-pyrazolinone (4-amino-antipyrine). The reactions taking place with the present analysis system may be thus exemplified:

(I) Glucose + $H_2O$ + $O_2$ $\xrightarrow{GOD}$ Gluconic acid + $H_2O_2$
(II) $H_2O_2$ + Ferrocyanide $\xrightarrow{POD}$ $H_2O$ + Ferricyanide
(III) Ferricyanide + Reactive Detector → Ferrocyanide + Colored quinone.

The reaction (III) may be written more specifically, in the following manner:

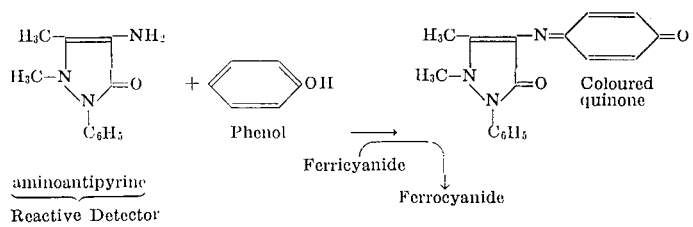

Other methods already known in the literature although utilizing separately and independently some substances used in the present system, have, as already stated, some disadvantages. For instance, the method described by Hall and Tucker (Anal. Biochem. 26, 12, 1968), wherein only the ferrocyanide is used as chromogen acceptor, presents at least two drawbacks:

1. It is poorly sensitive; the ferricyanide which is formed in the reaction (II) can hardly be read in the usual photometers with a sufficient sensitivity;
2. It is affected by the presence of bilirubin, contained in the samples being examined; the bilirubin, in fact, absorbing the light in the visible spectrum in the same region as the ferricyanide, causes erroneously high results.

The method by Trinder (Ann. Clin. Biochem. 6, 24, 1969) wherein the phenol-aminophenazone binary system is used as chromogen acceptor, without the ferricyanide as intermediate, has only partially solved these two drawbacks. However, the use of said system directly in the enzymatic reaction (II) is also affected by the presence of interfering substances present in the samples. The author in fact describes the method as utilizable only for deproteinized samples. This fact constitutes a remarkable disadvantage in the routine of the chemical-clinical analysis laboratory.

The system of the present invention overcomes all of the aforesaid drawbacks and allows the quick determination of glucose with the following additional advantages:

a. The determinations may be made directly on non-deproteinized samples, although not excluding the use of deproteinized material;
b. the analysis may be made at room temperature in a relatively short time;
c. it is possible to use any colorimeter or spectrophotometer without any danger of loss of sensitivity;
d. the interferences due to bilirubin and to uric acid are eliminated;
e. manual or automatic use is possible, both with a direct reading at the end point or the taking of readings during the course of the reaction.

The substances composing the Reactive Detector must contain particular reactive chemical groups.

In its simplest formulation, the Reactive Detector may contain as a phenolic component, phenol and, as a derivative of the phenylpyrazolinone, 4-aminoantipyrine.

The Reactive Detector may be made more stable with particular additives (weak acids, glycerol, higher glycols, surface-active substances, etc.) which, beside stabilizing the reactive compounds may contribute to adjust the sensitivity of the system and to stabilize the final color.

The Reactive Detector may be formulated with the enzyme system and the reagents used therewith to form a single integrated system, or the Reactive Detector may be separated from the Enzymatic Reagent.

In order to obtain the end chromogen reaction, it is necessary to produce the chemical structure having the following conjugate system:

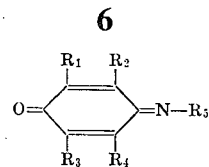

wherein the oxidized benzenoid ring is provided by the phenolic compound, $R_1$–$R_4$ representing substituents on the ring, and the group =N---$R_5$ by the aminoantipyrine. Hereinafter, the term "aminoantipyrine" shall refer to 4-aminoantipyrine per se as well as to structurally related compounds. The union between the oxidized phenol and aminoantipyrine may take place in the para-position to the oxidized OH group as shown in the formula above or in the ortho-position.

Phenolic compounds include phenol and substituted phenols, naphthols and substituted naphthols, hydroxyquinolines and hydroxyquinaldines and substituted derivatives thereof, and the like. Examples of such compounds are tabulated below.

Taking the phenol structure as a base and indicating with $R_{1,2,3,4,5}$ the different substituent groups other than hydrogen,

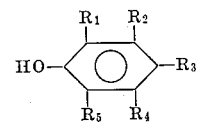

the following phenolic compounds are useful in the practice of the present invention:

TABLE I

| Compound | $R_1$ | $R_2$ | $R_3$ | $R_4$ | $R_5$ |
| --- | --- | --- | --- | --- | --- |
| Phenol | | | | | |
| o-Cresol | $CH_3$ | | | | |
| m-Cresol | | $CH_3$ | | | |
| 5-hydroxy-1,3-dimethylbenzene | | $CH_3$ | | $CH_3$ | |
| 3-hydroxy-1,4-dimethylbenzene | $CH_3$ | | | $CH_3$ | |
| Thymol | | $CH_3$ | | | $C_3H_7$ |
| Carvacrol | $CH_3$ | | $C_3H_7$ | | |
| o-Hydroxydiphenyl | $C_6H_5$ | | | | |
| o-Cyclohexylphenol | $C_6H_{11}$ | | | | |
| o-Hydroxyacetophenone | $COCH_3$ | | | | |
| 2,4'-dihydroxybenzophenone | $COC_6H_4OH$ | | | | |
| 2-chloro-5-hydroxytoluene | | $CH_3$ | $Cl$ | | |
| o-Chlorophenol | $Cl$ | | | | |
| p-Chlorophenol | | | $Cl$ | | |
| 2,4-dichlorophenol | $Cl$ | | $Cl$ | | |
| p-Bromophenol | | | $Br$ | | |
| 2,6-dibromophenol | $Br$ | | | | $Br$ |
| 2,4,6-tribromophenol | $Br$ | | $Br$ | | $Br$ |
| Guaiacol | $OCH_3$ | | | | |
| Resorcinol monomethyl ether | | $OCH_3$ | | | |
| Hydroquinone monomethyl ether | | | $OCH_3$ | | |
| Guaiacol sulphonate | $OCH_3$ | | | | $SO_3^-$ |
| o-Phenolsulphonic acid | $SO_3H$ | | | | |
| p-Phenolsulphonic acid | | | $SO_3H$ | | |
| Salicylic acid | $COOH$ | | | | |
| m-Hydroxybenzoic acid | | $COOH$ | | | |
| p-Hydroxybenzoic acid | | | $COOH$ | | |
| Methyl p-hydroxybenzoate | | | $COOCH_3$ | | |
| Methyl salicylate | $COOCH_3$ | | | | |
| Phenyl salicylate (salol) | $COOC_6H_5$ | | | | |
| Salicylsalicylic acid | $COOC_6H_4$<br>\|<br>$CO_2H$ | | | | |
| Salicylamide | $CONH_2$ | | | | |
| Salicylaldehyde | $CHO$ | | | | |
| Vanillic acid | $OCH_3$ | | $CHO$ | | |
| 3,5-dibromo-4-hydroxybenzoic acid | $Br$ | | $COOH$ | | $Br$ |
| Catechol | $OH$ | | | | |
| Resorcinol | | $OH$ | | | |
| Orcinol | | $OH$ | | $CH_3$ | |
| Epinephrine | $OH$ | | | $NHCH_3$<br>\|<br>$CH_2CHOH$ | |
| Phloroglucinol | | $OH$ | $OH$ | | |
| Pyrogallol | $OH$ | $OH$ | | | |
| m-Aminophenol | | $NH_2$ | | | |

When a naphthol is used in place of a phenolic compound, such as, for example 1-napththol, the chromogen has the following structure:

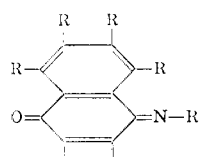

wherein the R's represent substituents. Taking the naphthalene structure as a base and indicating with $R_{1,2,3,4,5,6,7,8}$ the different substituent groups,

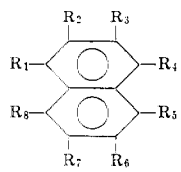

the following compounds can be used in the practice of this invention:

TABLE II

| COMPOUND | $R_1$ | $R_2$ | $R_3$ | $R_4$ | $R_5$ | $R_6$ | $R_7$ | $R_8$ |
|---|---|---|---|---|---|---|---|---|
| 1-naphthol | OH | | | | | | | |
| L Acid | OH | | | | $SO_3H$ | | | |
| 1-naphthol-4-sulphonic Acid | OH | | | $SO_3H$ | | | | |
| Chromotropic acid | OH | | $SO_3H$ | | | $SO_3H$ | | OH |
| H Acid | OH | | $SO_3H$ | | | $SO_3H$ | | $NH_2$ |
| 1-naphthol-7-amino-3-sulphonic acid | OH | | $SO_3H$ | | | | $NH_2$ | |
| 2-naphthol | | OH | | | | | | |
| R acid | | OH | $SO_3H$ | | | $SO_3H$ | | |
| G acid (dipotassium salt) | | OH | | | | $SO_3H$ | | $SO_3H$ |
| Schaeffer acid | | OH | | | | $SO_3H$ | | |
| 3-hydroxy-2-naphthoic acid | | OH | COOH | | | | | |
| 3-hydroxy-2-naphthamide-N-substituted | | OH | COHHF | | | | | |

The chromogen derived from the use of 8-hydroxyquinoline may be schematically represented as follows:

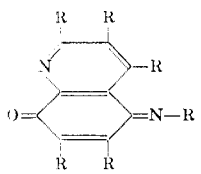

Taking the quinoline structure as a base and indicating by $R_{1,2,3,4,5,6,7}$ the different substituent groups,

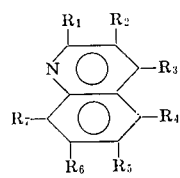

the following compounds can be used in the practice of this invention:

TABLE III

| COMPOUND | $R_1$ | $R_2$ | $R_3$ | $R_4$ | $R_5$ | $R_6$ | $R_7$ |
|---|---|---|---|---|---|---|---|
| 3-hydroxyquinaldine | $CH_3$ | OH | | | | | |
| 5-hydroxyquinoline | | | | OH | | | |
| 6-hydroxyquinoline | | | | | OH | | |
| 7-hydroxyquinoline | | | | | | OH | |
| 8-hydroxyquinoline | | | | | | | OH |
| 7-methyl-3-hydroxyquinoline | | | | | | $CH_3$ | OH |
| 8-hydroxyquinoline-5-sulphonic acid | | | | $SO_3H$ | | | OH |

Beside the compounds included in the above table, other phenolic compounds which can be used in the practices of this invention include:

barbituric acid and derivatives (not substituted in position 5):

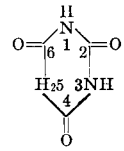

-5-pyrazolone:

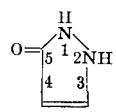

-dichelohydrindene:

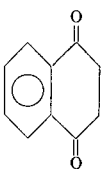

2,4-diamino-6-hydroxypyrimidine:

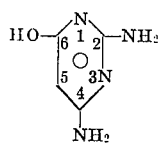

The aminoantipyrine is a derivative of 1-phenyl-5-pyrazoline of the structure

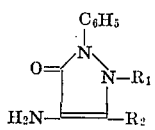

In 4-aminoantipyrine both $R_1$ and $R_2$ are methyl groups.

The aminoantipyrines may also be substituted in the reactive system by other compounds, although it is the most efficient and suitable for the purpose.

Other compounds that can be used in the system in place of 4-aminoantipyrine include:

Aminophenazone: (4-dimethylamino-2,3-dimethyl-1-phenyl-3-pyrazolin-5-one);
Sulphamipyrine: (2,3-dimethyl-1-phenyl-5-pyrazolon-4-yl aminomethansulphonic acid Na salt);
Dibupyrone: (1-phenyl-2,3-dimethyl-5-pyrazolone-4-il) isobutylamino)methanesulphonic acid Na salt);
Propylphenazone: (4-isopropyl-2,3-dimethyl-1--phenyl-3-pyrazolin-5-one);
Thozalinone: (2-dimethylamino-5-phenyl-2-oxazolin--4-one);
Methampyrone: (1-phenyl-2,3-dimethyl-5-pyrazolon-4-yl methylaminomethanesulphonic acid sodium salt.

The invention will be more fully understood from the Examples which follow. These examples are given by way of illustration and are not to be considered as limiting. All operations in these examples may be carried out manually or automatically using standard equipment.

EXAMPLE A

DETERMINATION OF GLUCOSE WITH END POINT READING

The principle of the reaction is the following: the material being examined is mixed with the Enzymatic Reagent and is left to react for a certain time. After incubation at room temperature, the Reactive Detector which determines the color development, is added; upon the complete color development, the photometric reading is taken at a suitable wavelength.

In this system, the reagents comprise:
1. ENZYMATIC REAGENT which contains:
   a. the GOD and POD enzymes,
   b. the buffer system, which may be set up by phosphates, tromethamine, acetate, aminopropandiol and derivatives, or equivalents thereof, and having a molarity between about 0.01 and 0.5 and a pH between about 5.5 and 8;
   c. the sodium or potassium ferrocyanide.

This reagent may be prepared in a dry form (powder, lyophilized, tablets or the like) or in a stabilized solution. An antiseptic and/or fungicide may be also added to the reagent. For this purpose, it is to be pointed out that some antiseptics may be used also as reagents: for example, the para and meta- hydroxybenzoates and their esters (methyl, propyl, etc.) have the phenolic function and thus may be used instead of the phenol in the composition of the Reactive Detector.

REACTIVE DETECTOR which contains: (a) a phenolic compound and (b) an aminoantipyrine.

In case a hydroxybenzoate has been used as an antiseptic in the Enzymatic Reagent, such substance, as noted above, also has a phenolic function, and the phenolic substance can then be omitted from the Reactive Detector.

The Reactive Detector may also be prepared in different forms:
1. in a solution ready for use suitably stabilized;
2. in a concentrated form, with separate components, that is, with a concentrated and stabilized solution of a phenolic compound and a concentrated and stabilized solution of an aminoantipyrine; these two concentrated solutions must be diluted and mixed before use;
3. with the phenolic compound in a dilute solution and with the aminoantipyrine in a separate concentrated solution; in this case, in order to obtain the Reactive Detector ready for use, it is sufficient to mix the two solutions, without any further dilution in water;
4. with the phenolic compound in a diluted or concentrated solution, and the aminoantipyrine in a dry form (powder, lyophilized or friable tablets);
5. with the aminoantipyrine in solution, diluted or concentrated and with a solid phenolic compound;
6. with a solid phenolic compound and the aminoantipyrine in a dry form, as above.

EXAMPLE B

DETERMINATION OF GLUCOSE WITH A CONTINUOUS READING (KINETIC METHOD)

The reaction principle is as follows:
1. The material to be tested is diluted with an appropriate Reactive Diluent in a stabilized solution. This Reactive Diluent contains either one of two components of the Reactive Detector.
2. The Enzymatic Reagent is added and continuous photometric readings are made for a period of 0.5–3 minutes (facilitated by the employment of proper equipment provided with a recorder); the reading instead of being continuous, may be at fixed intervals. The average rate of the increment of the Optical Density against the time is then calculated.

According to this system, the reactive compounds may be thus conceived:

REACTIVE DILUENT containing: the aminoantipyrine in a stabilized solution ready for use (or in a concentrated solution to be diluted or in a dry form to be dissolved in water); alternatively, the Reactive Diluent may be formed by a solution of a phenolic compound in a stabilized solution ready for use or in a concentrated solution to be diluted.

ENZYMATIC REAGENT containing: (a) the GOD and POD enzymes; (b) the buffer system which may be set up by phosphates, tromethamine, acetate, aminopropandiol and derivatives, or other equivalent compounds, and having a molarity between about 0.01 and 0.5 and a pH between about 5.5 and 8; (c) sodium or potassium ferrocyanide (in this particular type of "kinetic" reaction, the ferrocyanide may, if desired, be omitted, the phenolicaminoantipyrine system being sufficient to obtain a coloring which is measurable photometrically with equally accurate and specific results); (d) the phenolic compound, if the Reactive Diluent contains an aminoantipyrine, or the aminoantipyrine if the Reactive Diluent contains a phenolic compound.

While for the end reading method, the redox terminal components which are most suitable seem to be phenol and 4-aminoantipyrine, or methyl p-hydroxybenzoate and 4-aminoantipyrine, by which it is possible to obtain both a good sensitivity and a remarkable stability of the final color (therefore the end reading may be made within a large time margin), for the continuous reading method (kinetic test) coupling of salicylamide (instead of phenol) with the 4-aminoantipyrine is preferred since the salicylamide has a higher reaction speed and a higher sensitivity (properties which would be useful also for the end point reading test), but has the property — unfavorable in the case of the end point reading but negligible in the kinetic test — of producing a none too firm final color. In the kinetic test, then one may exploit the favorable properties of the salicylamide (higher sensitivity and higher reaction speed) neglecting the negative characteristics (final color instability) thereof because it does not give any problem in the specific case.

The Enzymatic Reagent for the kinetic test, like that for the test with end reading, may be prepared in a dry form (powder, lyophilized, tablets and the like), or in a stabilized solution.

EXAMPLE C

SINGLE REACTIVE COMPOUND FOR THE GLUCOSE DETERMINATION WITH AN END POINT OR CONTINUOUS READING

Some phenolic compounds (for instance, barbituric acid, the parahydroxybenzoates and the like) although having a minor sensitivity with respect to phenol, are better suited for the formulation of a single reactant owing to the major stability which they show in aqueous solution in the presence of all the other substances.

Using the single reactant system, the analysis technique is reduced to a single mixing of the sample being examined with the aforesaid reactant. In the case of end point reading, the mixture must be left some time in incubation before effecting the photometric reading; in the case of the kinetic test, the reading (continuous or at intervals) is immediately effected after the mixing and continued for 0.5–3 minutes. The aforesaid methods may be carried out either manually or with automatic equipments.

An example of a single reactant formulation may be the following: in a single mixture (in dry form to increase the stability) there are all the substances required for the enzymatic and chromogen reactions, i.e., the GOD and POD enzymes, the buffer (phosphate, tromethamine, acetate, aminopropandiol or derivatives, etc.), the phenolic compound such as barbituric acid or esters of paraor meta-hydroxybenzoates and an aminoantipyrine.

In this case, the Reactive Detector is obviously combined with the Enzymatic Reagent.

Summarizing, according to the stated examples and according to a group of fundamental reactions, three different groups of reagents have been developed:
1. Enzymatic Reagent + Reactive Detector, suited for the determination of glucose with the end point reading system.
2. Enzymatic Reagent + Reactive Diluent, suited for the determination of glucose with the immediate and continuous reading system or with readings at regular intervals (kinetic test).
3. Single Reagent, suited for the determination of glucose both with the end point reading system and with the kinetic test.

I claim:

1. A process for the enzymatic determination of the amount of glucose present in body fluids which comprises the steps:
   i. adding to a sample of a body fluid an enzymatic system containing glucose-oxidase and peroxidase, to which has been added sodium or potassium ferrocyanide,
   ii. incubating the sample and enzyme system at room temperature whereby the ferrocyanide is converted to ferricyanide equivalent to the amount of glucose present in the sample, and
   iii. reacting the ferricyanide with a reducing system which forms a colored product on oxidation, the color being a measure of the ferricyanide present, said reducing system consisting of a phenolic compound and an aminoantipyrine.

2. A process according to claim 1 wherein the phenolic compound is selected from the group consisting of phenol, salicylamide, barbituric acid, and esters of hydroxybenzoic acid.

3. A process according to claim 2 wherein the phenolic compound is phenol.

4. A process according to claim 3 wherein the aminoantipyrine is 4-aminoantipyrine.

5. A composition for use in the determination of glucose in body fluids by the method of claim 1, which comprises
   i. an enzymatic system consisting of glucose-oxidase and peroxidase,
   ii. sodium or potassium ferrocyanide,
   iii. a phenolic compound, and
   iv. an aminoantipyrine 6. A composition according to claim 5 wherein said composition is buffered at a pH between about 5.5 and 8.

7. A composition according to claim 5 which is in two parts, the first part comprising
   i. an enzymatic system consisting of glucose-oxidase and peroxidase, and
   ii. sodium or potassium ferrocyanide, and the second part comprising
   i. a phenolic compound and
   ii. an aminoantipyrine 8. a composition according to claim 5 which is in two parts, the first part comprising
   i. an enzymatic system consisting of glucose-oxidase and peroxidase,
   ii. sodium or potassium ferrocyanide, and
   iii. a phenolic compound, and the second part comprising an aminoantipyrine.

9. A composition according to claim 8 wherein the part containing the enzyme system is buffered at a pH between about 5.5 to 8.

10. A composition according to claim 6 wherein the phenolic compound is phenol.

11. A composition according to claim 10 wherein the aminoantipyrine is 4-aminoantipyrine.

12. A composition according to claim 9 wherein the phenolic compound is phenol.

13. A composition according to claim 12 wherein the aminoantipyrine compound is 4-aminoantipyrine.

14. A composition according to claim 7 wherein the part containing the enzyme system is buffered at a pH between about 5.5 to 8.

* * * * *